United States Patent [19]
Stine

[11] Patent Number: 5,678,461
[45] Date of Patent: Oct. 21, 1997

[54] TRANSMISSION COOLING SYSTEM

[75] Inventor: Alan C. Stine, Kalamazoo, Mich.

[73] Assignee: Eaton Corporation, Cleveland, Ohio

[21] Appl. No.: 586,330

[22] Filed: Jan. 16, 1996

[51] Int. Cl.[6] .................................. F16H 57/02
[52] U.S. Cl. .................. 74/606 A; 74/606 R; 74/730.1; 184/6
[58] Field of Search ............... 74/606 R, 606 A; 75/161; 184/6.12, 6.13, 26

[56] References Cited

U.S. PATENT DOCUMENTS

| | | | |
|---|---|---|---|
| 3,566,999 | 3/1971 | Robinson | 192/3.28 |
| 3,728,909 | 4/1973 | Jespersen | 74/491 |
| 3,802,795 | 4/1974 | Nyeste et al. | 74/421 |
| 3,886,814 | 6/1975 | Bullard et al. | 475/161 |
| 4,356,889 | 11/1982 | Teeter | 184/6.12 |
| 4,418,777 | 12/1983 | Stockton | 184/6.12 |
| 4,713,982 | 12/1987 | Fluegel et al. | 475/161 |
| 4,754,665 | 7/1988 | Vandervoort | 74/745 |
| 4,909,354 | 3/1990 | Fluegel | 184/6 |
| 5,279,391 | 1/1994 | Ward | 184/6.12 |
| 5,370,013 | 12/1994 | Reynolds et al. | 74/330 |
| 5,372,213 | 12/1994 | Hasebe et al. | 180/65.6 |

FOREIGN PATENT DOCUMENTS 839754  6/1981  U.S.S.R. .................. 475/161

*Primary Examiner*—Vinh T. Luong
*Attorney, Agent, or Firm*—Howard D. Gordon

[57] ABSTRACT

A transmission cooling system (10) for a vehicle equipped with an engine (12) having a pressurized liquid cooling system (50). The transmission cooling system includes an oil-to-water-type heat exchanger (40) located in the transmission lubricant sump (36) and fluidly connected in series to the engine cooling system.

13 Claims, 3 Drawing Sheets

TRANSMISSION COOLING SYSTEM

BACKGROUND OF THE INVENTION

1. Field of the Invention

The present invention relates to a transmission cooling system for vehicles equipped with an engine having a pressurized fluid cooling system and a change-gear transmission. In particular, the present invention relates to a transmission cooling system including a heat exchanger located in the transmission lubricating/cooling fluid sump and connected in series with the vehicle engine pressurized fluid cooling system.

2. Description of the Prior Art

Vehicular change-gear transmissions, especially synchronized and non-synchronized, multiple-speed transmissions for heavy-duty vehicles, are known in the prior art, as may be seen by reference to U.S. Pat. Nos. 3,105,395; 4,735,109; 4,754,665; 5,086,897; 5,193,410 and 5,370,013, the disclosures of which are incorporated herein by reference. It also is known that such transmissions may generate excessive heat in certain high torque capacity, severe duty cycle and/or shielded mounting conditions and may require cooling greater than available from passive heat radiation from the transmission casing. Supplemental transmission cooling systems for providing additional cooling for the transmission lubricating/cooling fluid are known in the prior art, as may be seen by reference to U.S. Pat. Nos. 4,356,889; 5,157,963 and 5,279,391, the disclosures of which are incorporated herein by reference.

While the prior art supplemental transmission cooling systems generally are effective, they are not totally satisfactory, as they may provide excessive cooling capacity, require a chassis-mounted lubricating/cooling fluid-to-air heat exchanger, require objectionable fluid connections and/ or require a transmission-driven lubricating/cooling fluid pump.

SUMMARY OF THE INVENTION

In accordance with the present invention, the drawbacks of the prior art are minimized or eliminated by the provision of a transmission cooling system not requiring a transmission-driven pump or a separate chassis-mounted heat exchanger. The foregoing is accomplished, in a vehicle having a liquid-cooled engine, by providing an integral cooling-fluid-to-lubricating-fluid heat exchanger in the transmission lubrication sump, which heat exchanger is connected in series with the engine cooling fluid system.

This and other objects and advantages of the present invention will become apparent from a reading of the following description of the preferred embodiment taken in connection with the attached drawings.

DESCRIPTION OF THE PREFERRED EMBODIMENT

Figure 1:
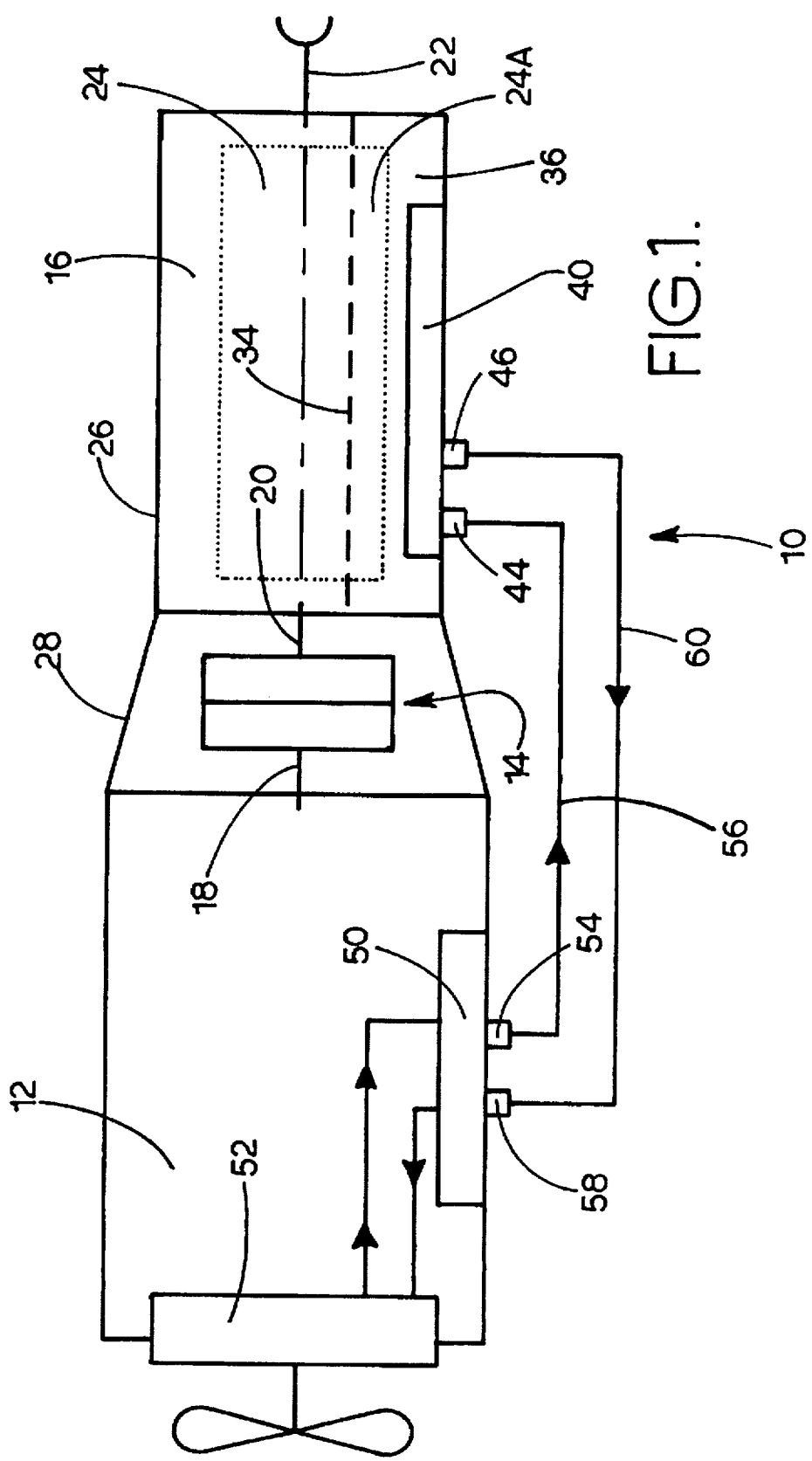
FIG. 1 is a schematic illustration of a transmission cooling system of the present invention.

In the present description of the preferred embodiment, certain terminology will be used for descriptive purposes only and is not intended to be limiting. The terms "upward," "downward," "rightward" and "leftward" designate directions in the drawings to which reference is made. The words "inward" and "outward" refer, respectively, to directions toward and away from the geometric center of the device and designated parts thereof. Said definitions apply to the terms specifically mentioned above, derivatives thereof and words of similar import.

The term "transmission" is used to designate a simple or compound vehicular change-gear transmission wherein a selected one of a plurality of simple or compound gear reductions may be manually or automatically selected between the transmission input shaft and transmission output shaft. Vehicular transmissions, including those transmissions utilized with heavy-duty vehicles, are well known in the prior art, as may be seen by reference to U.S. Pat. Nos. 3,105,395; 4,735,109; 4,754,665; 5,000,060; 5,089,965; 5,193,410 and 5,370,013, the disclosures of which are incorporated herein by reference.

The terms "cooling fluid" or "engine cooling fluid" refer to the liquid commonly used in vehicular engine cooling systems, which liquid typically is a combination of water and antifreeze/anti-overheating compound, such as alcohol, glycol or the like. The terms "transmission lubricating fluid" or "lubricating fluid" refer to the liquid commonly used in vehicular transmissions to provide lubrication and cooling for the rotating gearing. As is known, for heavy-duty transmissions, such transmissions are designed so that the internal rotating parts thereof operate in a bath of lubricating fluid, typically a natural or synthetic oil, circulated by the motion of the gears and shafts. Preferably, the various transmission housing components will have built-in channels where needed to circulate the lubricating fluid to the bearings and shafts. These lubricating fluids are often referred to as multipurpose gear oils and may conform to one or more of the following military specifications: MIL-L-2104 or MIL-L-2105.

The transmission cooling system 10 of the present invention may be seen in greater detail by reference to the drawings. In the drawings, a liquid-cooled engine 12, such as a well-known diesel engine or the like, is drivingly connected by a non-positive coupling 14 to a multiple-speed, change-gear transmission 16. Non-positive coupling 14 may be a master friction clutch, as illustrated in FIG. 1, a torque converter or the like. As illustrated, the engine output shaft or crankshaft 18 is connected to the transmission input shaft 20 by means of the selectively engaged and disengaged master friction clutch 14. The transmission output shaft 22 is connected to vehicle driveline devices such as a transfer case, a drive axle or the like. The input shaft 20 is drivingly connected to the output shaft 22 at various selectable drive ratios by the transmission rotating elements 24, which comprise shafts, gears, clutches and the like, as is well known in the prior art. The transmission 16 is contained within a transmission housing 26 including a clutch housing portion 28, which surrounds the master clutch 14 and mounts the transmission to the engine 12. The transmission input shaft 20, output shaft 22 and usually a mainshaft (not shown) all are rotatable about a common axis 30.

Figure 2:
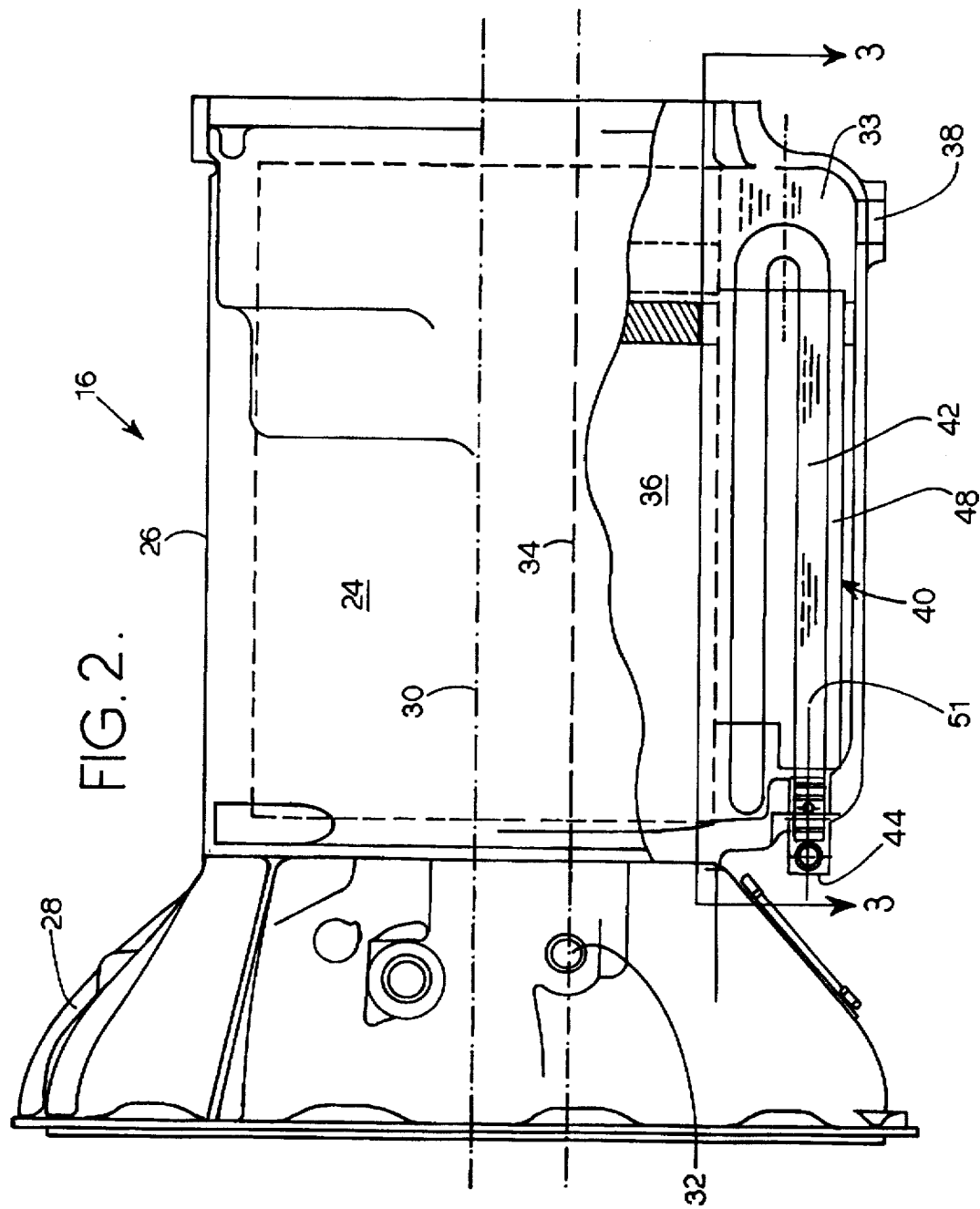
FIG. 2 is a partially sectioned side view of a transmission utilizing the cooling system of the present invention.
Figure 3:
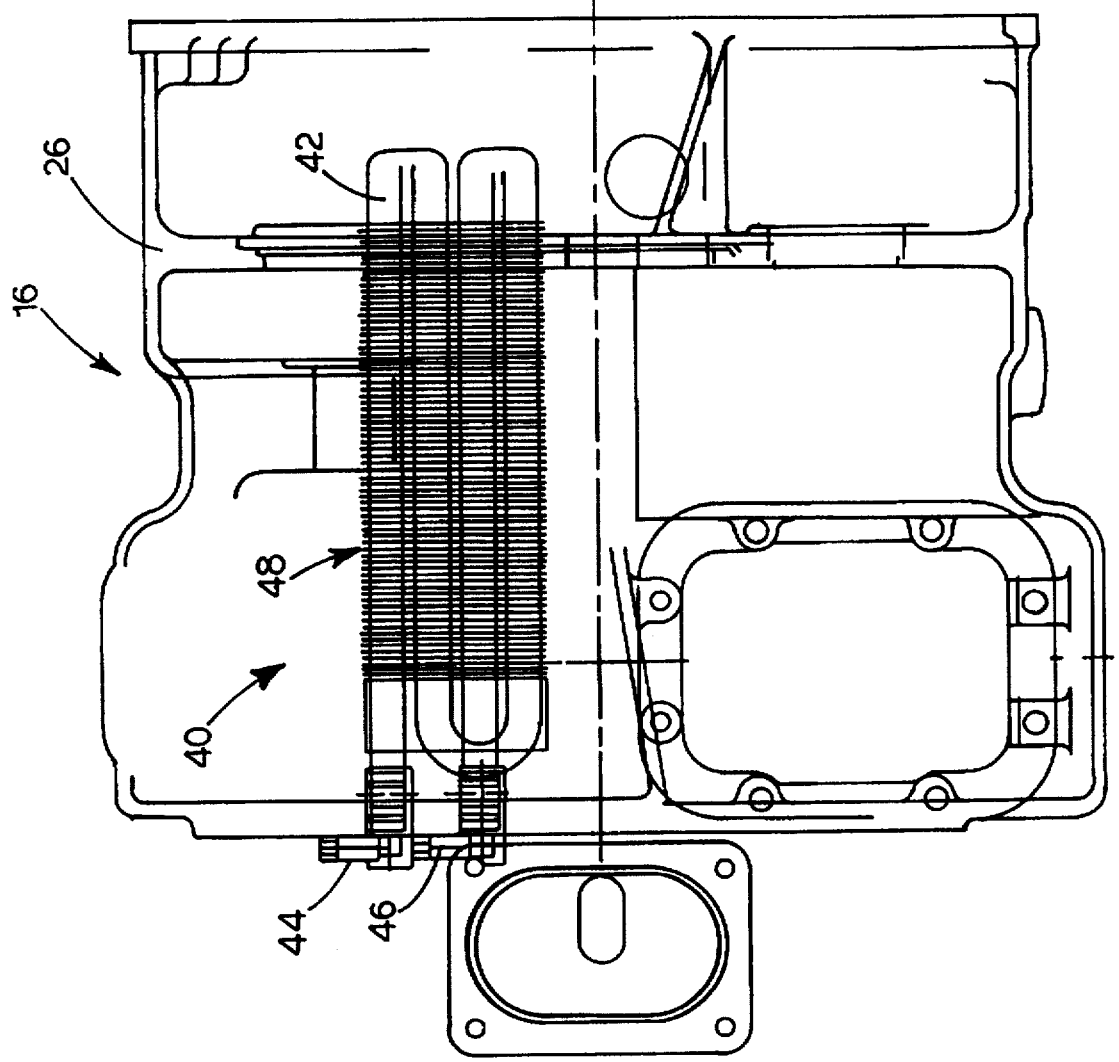
FIG. 3 is a top sectional view, taken on line 3—3 in FIG. 2, of a transmission utilizing the cooling system of the present invention.

As best seen in FIG. 2, the transmission housing 26 includes a lubricant fill opening 32 by which lubricant 33 may be introduced into the transmission housing up to a fill level 34 to define a lubricant sump 36 in the bottom portion of the transmission housing. As may be seen, at least a portion 24A of the transmission rotating elements passes through the lubricant sump 36 for proper cooling and lubrication of the transmission gearing. The transmission 16 also is provided with a drain plug opening 38 located at the bottom of the sump for draining transmission lubricating fluid. The transmission rotating elements also include the various bearings and the like.

For heavy-duty vehicular transmissions, such as the 7-speed, 9-speed, 10-speed, 13-speed, 16-speed and 18-speed transmissions sold by Eaton Corporation, assignee of this application, recommended transmission operating temperatures of 250° F. (120° C.) are considered to be maximum, with intermittent operating temperatures of up to 300° F. (150° C.) being permissible. Operating temperatures of at or above these levels will increase the lubricant's rate of oxidation and shorten its effective life. It is known that the following conditions, in any combination, can result in elevated operating temperatures unless some form of external cooling of the transmission lubricant is provided: (1) operating consistently at slow speeds, (2) high ambient operating temperatures, (3) restricted air flow around the transmission, (4) vehicle exhaust system too close to transmission, (5) extended overdrive operation, and (6) high horsepower/high torque transfer operation.

In the prior art, for vehicle installations where additional transmission cooling was required, such cooling usually was provided by an external oil cooler system comprising a chassis-mounted oil-to-air heat exchanger, a transmission-driven pump, and the necessary plumbing to fluidly connect the sump to the chassis-mounted heat exchanger. An example of such a system may be seen by reference to aforementioned U.S. Pat. No. 4,356,889. With the advent of less air flow across the vehicle transmission due to improve truck aerodynamics and/or increased usage of higher horsepower engines, the need for supplemental cooling for the transmission lubricating fluid has become more prevalent.

The prior art external cooling devices were not totally satisfactory, as they tended to be somewhat complicated and expensive, they required a transmission-driven pump device, and most particularly, they required a chassis-mounted oil-to-air heat exchanger mounted at a point on the vehicle chassis having significant air flow thereat. For one or more of the foregoing reasons, the use of exterior transmission oil coolers often was objectionable to vehicle users and/or original equipment manufacturers.

The transmission cooling system of the present invention requires an internal, preferably integral, transmission-lubricant-to-engine-coolant heat exchanger 40, also referred to as an "oil-to-water" heat exchanger, located in the transmission sump area 36 at a location below and/or offset to the transmission rotating elements. The heat exchanger 40 is of a relatively standard design comprising a serpentine tube 42 having an inlet connection 44 and an outlet connection 46 and a plurality of plate or fin members 48 for maximum heat transfer purposes. The engine-forced liquid cooling system 50 contains engine cooling fluid 51 and includes the vehicle radiator 52 and additionally includes a first connection 54 for connection to a fluid conduit 56 connected to the inlet connection 44 of the internal transmission heat exchanger 40, and a second fluid connection 58 for connecting fluid conduit 60 having one end thereof connected to the outlet connection 46 of the internal heat exchanger 40. Accordingly, the internal transmission oil-to-water heat exchanger 40 is connected, in series, with the vehicle pressurized liquid cooling system whereby to define an engine cooling fluid circuit the cooling liquid in the vehicle cooling system also will flow through the transmission internal cooler 40.

While the invention is illustrated as utilized with a transmission having gearing 24 rotating in the sump 36, it also is applicable to "dry sump" type transmissions of the type illustrated in aforementioned U.S. Pat. No. 5,279,391.

Accordingly, the existing vehicle radiator 52 acts as a heat exchanger to air for both the transmission heat exchanger 40 and the engine cooling system 50, eliminating the need for a separate oil-to-air heat exchanger. Further, due to the relatively close proximity of the engine and the transmission in a vehicle, the requirement for plumbing for the supplemental transmission heat exchanger 40 is simplified and minimized, and the requirement for an additional pumping element is eliminated.

Although the preferred embodiment of the present invention has been described with a certain degree of particularity, various changes to form and detail may be made without departing from the spirit and scope of the invention as hereinafter claimed.

I claim:

1. A vehicular transmission including a transmission cooling system for use with a vehicular internal combustion engine having an engine cooling system utilizing pressurized engine cooling fluid circulating in an engine cooling fluid circuit, said transmission including an input shaft drivingly connectable to an output shaft by variable ratio transmission gearing contained in a transmission housing defining a lubricant sump for transmission lubricating fluid, said transmission comprising:

a transmission lubricating fluid-to-engine cooling fluid heat exchanger locating in said sump, said heat exchanger including a fluid conduit having an inlet and an outlet for fluid connection to said engine cooling fluid circuit.

2. The transmission of claim 1 wherein said fluid conduit is of serpentine shape.

3. The transmission cooling system of claim 1 wherein at least a portion of said transmission gearing rotates in said sump.

4. A vehicular transmission for use with a vehicular internal combustion engine having an engine cooling system utilizing pressurized engine cooling fluid circulating in an engine cooling fluid circuit, said transmission including:

an input shaft drivingly connectable to an output shaft by variable ratio transmission gearing;

a transmission housing containing said gearing and defining a lubricant sump for transmission lubricating fluid; and a transmission cooling system comprising a transmission lubricating fluid-to-engine cooling fluid heat exchanger locating in said sump, said heat exchanger including a conduit having an inlet and an outlet for fluid connection to said engine cooling fluid circuit.

5. The transmission of claim 4 wherein said conduit is of serpentine shape.

6. The transmission of claim 4 wherein at least a portion of said transmission gearing rotates in said sump.

7. A vehicular transmission, master clutch and engine combination comprising:

an internal combustion engine having an engine cooling system utilizing pressurized engine cooling fluid circulating in an engine cooling fluid circuit including a radiator for engine cooling fluid-to-air heat exchange; and a friction master clutch for selectively drivingly connecting an output of said engine to a transmission input shaft;

a variable ratio transmission including said transmission input shaft drivingly connectable to a transmission output shaft by variable ratio transmission gearing, a transmission housing containing said gearing and defining a non-pressurized lubricant sump for transmission lubricating fluid, at least a portion of said transmission gearing rotatable in said sump, and a transmission cooling system comprising a transmission lubricating fluid-to-engine cooling fluid heat exchanger locating in said sump, said heat exchanger including a conduit having an inlet and an outlet for fluid connection to said engine cooling fluid circuit.

8. The combination of claim 7 wherein said conduit is of serpentine shape.

9. The combination of claim 7 wherein said engine cooling fluid is a water-based liquid and said transmission lubricating fluid is an oil-based liquid.

10. The combination of claim 9 wherein said conduit is connected in series in said engine cooling circuit.

11. The combination of claim 10 wherein said vehicle includes a radiator for engine cooling fluid-to-air heat exchange.

12. The combination of claim 7 wherein said conduit is connected in series in said engine cooling circuit.

13. The combination of claim 12 wherein said vehicle includes a radiator for engine cooling fluid-to-air heat exchange.

* * * * *